350-379 SR

OR 3,402,001

X4021Y X4025W

Sept. 17, 1968 H. FLEISHER 3,402,001

SELECTIVE GATING OF RADIATION

Filed June 6, 1963

INVENTOR.
HAROLD FLEISHER

BY Maurice H. Klitzman

ATTORNEY

United States Patent Office 3,402,001
Patented Sept. 17, 1968

3,402,001
SELECTIVE GATING OF RADIATION

Harold Fleisher, Poughkeepsie, N.Y., assignor to International Business Machines Corporation, New York, N.Y., a corporation of New York Filed June 6, 1963, Ser. No. 286,087
18 Claims. (Cl. 350—150)

This invention is related to the control and direction of high frequency electromagnetic radiation. In particular this invention is concerned with the selective gating of high frequency radiation to a predetermined point with good definition and with a minimum of delay.

Light and other high frequency electromagnetic radiation has many useful and beneficial properties which can be employed to great advantage. One of the beneficial properties of this type of radiation is the speed of travel, which is the greatest speed presently known in nature. High frequency electromagnetic radiation can be generated quickly, inexpensively, and conveniently. It can be detected with structurally simple equipment. High frequency electromagnetic radiation, unlike lower frequency electromagnetic radiation, does not diffract around large objects. High frequency electromagnetic radiation therefore can be transferred with a minimum of losses in the transmission path and wtih a minimum of interference to nearby equipment.

In the utilization of light and electromagnetic radiation having similar characteristics, it is often desirable to selectively gate such radiation to a predetermined point with a minimum of delay and with good definition between the open and the closed states of the gate. When such gating is made dependent upon two inputs, the appearance of radiation focused at a predetermined point can be utilized to indicate relationships of the inputs.

Gating of high frequency electromagnetic radiation has been accomplished at high speeds by the use of electrical means, but the difference in output signal between the off state and the on state is generally unsatisfactory. In such electrical systems gating is generally accomplished by merely creating an imperfect opaque screen by some electrical means. To the extent that high frequency electromagnetic radiation has been switched or gated with the additional feature of focusing and defocusing the radiation such gating has generally been obtained by the mechanical moving of parts in the radiation transmission system. However, mechanical adjustment of this kind is slow. This invention is an improvement over such mechanical gating systems in that it responds to an electrical potential rather than any mechanical means. High speed is obtained with greatly improved definition in the output, which definition is obtained by the focusing and defocusing of the radiation. The definition of this invention is therefore good, while the speeds obtained are as fast as any electrical system.

It is an object of this invention to create an electromagnetic radiation gate which can be opened and closed with improved speed and definition.

It is a further object of this invention to provide a system which can focus electromagnetic radiation to a point and which can be activated and deactivated with a minimum of time delay.

It is a still further object of this invention to create a logical device with improved speed and definition.

It is another object of this invention to create a logical device which switches high frequency electromagnetic radiation with improved speed and with good definition.

It is still another object of this invention to create a high speed electromagnetic radiation switch with improved definition in the output signal indicative of the result.

It is a more specific object of this invention to create a high speed electromagnetic radiation Exclusive Or system.

It is a more general object of this invention to create an electromagnetic radiation gate which has no moving parts and is therefore more reliable.

It is a still more general object of this invention to go at high speed from a latent lens structure state (one which is structurally complete, but not active) to a patent lens structure state (one which is structurally complete, and properly activated).

In accordance with the broadest aspect of the invention, high frequency radiation is gated by providing means to selectively impress an electric field across a substance which exhibits an electro-optic effect when in the presence of an electric field. Furthermore, the electric field impressed is designed to activate the electro-optic substance at positions which define a Fresnel zone plate mask or any other configuration which diffracts light to a point. The portions of the substance activated can be designed to define a zone plate mask which will diffract light to the desired point, or, the gaps between the portions of the substance activated can be designed to define a zone plate mask which will diffract light to the desired point. Since Fresnel zone plates are designed for use with a predetermined, single, high frequency, the radiation to be gated is collimated, monochromatic electromagnetic radiation of high frequency. By directing this light perpendicular to the zone plate mask, in accordance with requirements for the use of such a mask, radiation emerging from the activated mask will result in components which are orthogonal in accordance with the mask pattern. Since radiation of one polarity does not interfere with radiation of a polarity orthogonal to the one polarity, Fresnel focusing occurs. Although not essential to the invention, it is preferred to locate an analyzer to intercept the radiation as it emerges from the electro-optic substance so that the definition between the open state and the closed state is improved.

In accordance with a more specific aspect of the preferred embodiment of the invention, the source of collimated, monochromatic radiation is provided with means to linearly polarize the radiation so that all of the radiation will be focused. Radiation emerging from the activated portions of the electro-optic substance is therefore largely orthogonal to all the radiation emerging from the gaps between the activated portions. Had the impinging radiation not been linearly polarized, a portion of the emerging radiation would have been the same in polarization across the entire area of the mask, and this portion would not have been diffracted. In this more specific aspect of the invention in which the impinging light is linearly polarized, both the mask defined by the portions activated and the mask defined by the gaps between the portions activated constitute close approximations to Fresnel zone plates, each of which will focus to substantially the same, preselected point. The bands of radiation of one status of polarization are orthogonal to and therefore do not interfere with the bands of radiation of the second, orthogonal, status of polarization. Thus, two independent Fresnel zone plates are operative and all of the radiation is focused to approximately the same point. Since all the radiation is focused, the analyzer is undesirable and is not used. Yet the maximum benefit is obtained from all light because all of the light is focused.

In accordance with still another aspect of this invention a logical circuit is provided by locating two selectively activatable focusing elements of the type above described in the optical path, both of such elements being designed to focus at substantially the same point. The two focusing elements when activated define complimentary diffraction masks across the effective transmission path. With this arrangement, activation of either focusing element will cause focusing while activation of both focusing elements will defocus the radiation.

The foregoing and other objects, features, and advantages of the invention will be apparent from the following more particular description of the preferred embodiment of the invention, as illustrated in the accompanying drawings.

Figure 1:
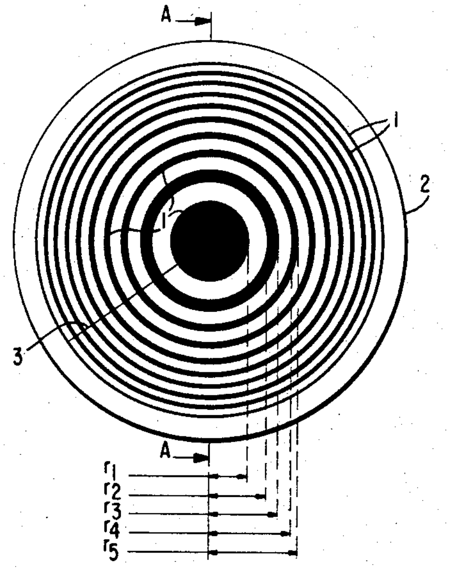
FIG. 1 shows the pattern of electrodes of a Fresnel zone plate useful in the preferred embodiment.

For purposes of illustrating the invention reference is now made to FIG. 1, which shows the electrode pattern used in the preferred embodiment. Transparent, conductive electrodes 1 of evaporated stannous oxide are at locations defined by the basic Fresnel zone plate mask formula. The Fresnel zone plate configuration is well known in the art. In general, the distance to the point of focus from the approximate center of each annular ring which is to pass light to be focused must be larger by one wave length for each ring of increased radius. In the preferred embodiment focusing is to occur with the light which passes through the annular gaps bounded by the concentric electrodes and also focusing is to occur with the light which emerges directly from the electrodes. Therefore, the contiguous electrodes and gaps are about the same size and each of the concentric rings of electrodes and the concentric rings of gaps satisfy the basic Fresnel formula.

The tables below show the relevant information for design of the Fresnel zone plate. Each radius $r$ is measured from the center of the zone plate to the edge of the electrode rings. The tables are thus based on the design equation $r_n = \sqrt{nb\lambda}$, where $r_n$ is the radius of the $n$th zone, $b$ is the distance from the focal point to the mask surface, and $\lambda$ is the wave length of the light to be focused. FIG. 1 shows, for the purposes of illustration, the shortest five radii of the zone plate illustrated figuratively by the use of dashed lines so that the manner of defining the radii will be made perfectly clear. Of course, the remaining radii are numbered in accordance with the same scheme, and it will be understood that the shortest five radii were chosen only as being the most convenient for the purposes of illustration.

TABLE I

Zone radii for:
$\lambda$=5000 A.
$b$=30 cm.

| $n$: | $r_n$ cm. |
|---|---|
| 1 | 0.0387 |
| 2 | 0.0548 |
| 10 | 0.1225 |
| 50 | 0.274 |

TABLE II

*Focus point with wave length*

| $\lambda$: | $b$, cm. |
|---|---|
| 4000 A | 37.5 |
| 5000 A | 30 |
| 6000 A | 25 |

The plate 2 upon which the electrodes 1 are mounted is composed of potassium dihydrogen phosphate (KDP) 1.5 mm. thick with a flat surface area sufficient to receive all of the electrodes 1 which make up the zone plate. Although KDP is used in the specific embodiment, it will be understood that any substance exhibiting the electro-optic effect is sufficient for use in this invention. In particular ADP ($NH_4H_2PO_4$) is also a well known electro-optic substance. The result desired in this invention is the change in the status of polarization in response with an electric field induced across the substance. When the electro-optic substance is a solid, the effect produced is often called the Pockels effect. It will be understood that even though the substance used in the preferred embodiment exhibits the Pockels effect, this invention is not limited to those substances which satisfy some rather extraneous definitions of the Pockels effect, in particular, those definitions which require the substance to be a piezoelectric crystal. Any substance which exhibits the electro-optic effect when in the presence of an electric field has utility in this invention.

Figure 2:
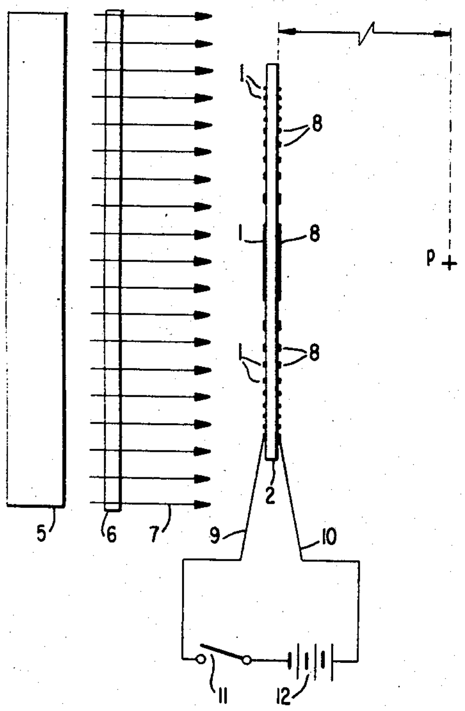
FIG. 2 is a somewhat exaggerated, cross-sectional view of the Fresnel lens, as seen from lines AA in FIG. 1 included with a complete optical system.

Reference is now made to FIG. 2 in which the basic system of the preferred embodiment is shown. The plate 2 appears in cross-section taken from AA of FIG. 1. The longitudinal dimensions are exaggerated in FIG. 2 for increased clarity in explaining the principles of the invention. A laser 5 is shown at the left as a preferred source of collimated, monochromatic light. The laser is especially well-suited for this purpose since monochromatic light is generally produced by a laser. Any source, however, of collimated, monochromatic light would be suitable for use with the invention since the invention is concerned with the switching of light and not with the method of producing light from a source.

The light from laser 5 is linearly polarized in the polarizer 6 by any of the well known means which linearly polarize radiation. The light, indicated on the drawing by numeral 7, impinges upon the plate 2, normal to the large surface of the plate, and is properly oriented, of course, with regard to the changes in polarization which are to be induced by the plate 2. The electrodes 1 shown in FIG. 1 appear in FIG. 2 cross-sectioned. FIG. 2 also illustrates the second electrodes 8, which are equal in size and are situated on plate 2 opposite to the electrodes 1. Electrodes 8, are thin layers of transparent, stannous oxide just as the electrodes 1 are also thin layers of transparent, stannous oxide. The electrodes 1 and 8 are shown connected by conductive leads 9 and 10, through a switch 11 to a source of potential 12. FIG. 1 shows a small, transparent conductor 3 connecting all of the electrodes 1 together electrically. The electrodes 8 are also connected electrically by a small, transparent conductor (not shown) identical to the connecting conductor 3 shown in FIG. 1. The point of focus $p$ is indicated figuratively on FIG. 2. It should be noted that the basic system has no moving part and is therefore a potentially rugged structure.

Since the electrodes 1 and 8 are transparent, the plate 2 in no way alters the light 7 until an electric field causes selected portions of the plate 2 to exhibit an electro-optic effect. Previous to activation by the electric field, the Fresnel focusing zone mask (which acts as a lens) is therefore latent. No focusing occurred at the point $p$.

Upon closing the switch 11, the source of potential 12 is connected across electrodes 1 and 8 and the zone mask is made patent (effective). The electrodes act as capacitors with plate 2 located in the electrical center. The electrodes opposite each other primarily interact and a series of electric fields therefore appears which is substantially coextensive with the electrodes 1 and 8. The plate 2 exhibits an electro-optic effect at those points through which the electric field is impressed. The status of polarization of the light 7 is therefore changed where it passes through the portions of plate 2 at locations where an electric field exists.

Focusing occurs because the light transmitted through the transparent electrodes, when voltage is applied, is in a Fresnel zone plate configuration as is also the light that is transmitted through the regions between the electrodes. Since the status of polarization of light emerging from the transparent electrodes is changed, the two Fresnel zone plate configurations of light each appears in the form of light which is orthogonal in polarization to the light in the other Fresnel zone plate configuration. Hence, the light in each configuration will not interfere with the light in the other configuration, and each configuration will independently and simultaneously focus to approximately the same point $p$ in the drawing.

Since activation of the plate 2 in response to the closing of switch 11 is very fast, the gate operates at high speed. Since the gate is closed by defocusing the radiation, the device is inherently one which produces good definition between the open and closed states.

Figure 3:
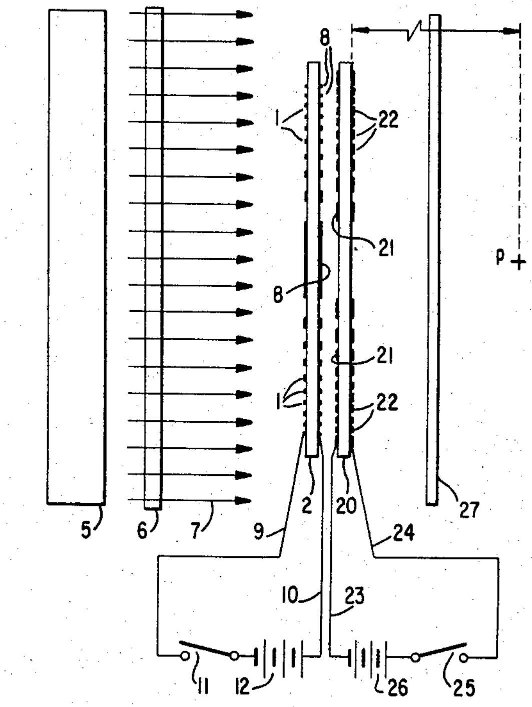
FIG. 3 shows a modification of the basic system shown in FIG. 2, but different in two major respects to obtain an Exclusive Or result.

In order to provide an Exclusive Or system, reference is made to FIG. 3, which shows such a system obtained from the basic invention described above. FIG. 3 is similar to FIG. 2 with the addition of a second plate 20, which is situated immediately past the plate 2, and the further addition of an analyzer 27, which is situated in the path of radiation emerging from the plate 20. The plate 20 has electrodes 21 and 22, which are connected by lines 23 and 24 to switch 25 and power source 26. A latent focusing element exists which is made effective in the manner as the focusing element on the plate 2 is made effective. The electrodes of plate 20 also form a Fresnel mask to focus substantially at $p$. However, the gap portions of the lens pattern of plate 20 are in the optical path of the electrode portions of the plate 2. The two patterns are complimentary in the sense that they have similar functions, structure, and operation, but the diffraction caused by plate 2 when activated intercepts the plate 20 at a location which operates upon the radiation in a manner opposite to the manner in which it was operated upon by the plate 2.

Upon activation of the electrodes of the plate 2 and deactivation of the electrodes of the plate 20, the plate 2 causes focusing substantially at the point $p$ in the manner fully discussed in connection with FIG. 2. Upon deactivation of the electrodes of plate 2 and activation of the electrodes of plate 20, radiation is unaffected by the plate 2 but is focused substantially at the point $p$ by the plate 20 which, except for its different focusing pattern, focuses by operating in the manner identical to that of plate 2 when it is activated. Concurrent activation of both plates 2 and 20 orients all radiation emerging from the plate 20 to the same polarization. This destroys Fresnel focusing and assures a large change in radiation magnitude at the point $p$ when both plates are activated relative to the radiation at $p$ when only one plate is activated. Thus, the definition of the logical system is good.

The analyzer 27 is oriented such that upon activation of both plates 2 and 20 all of the emerging radiation is of such polarization as to be extinguished by the analyzer 27. This further enhances the definition of the circuit since any imperfect defocusing of the emerging radiation will be negated by the presence of the analyzer which will not pass the radiation.

It should be noted that the Exclusive Or circuit just described functions by focusing and defocusing light. The spacing of the plates 2 and 20 is important, of course, to the proper changes in polarization required to defocus. When the plate 2 is activated, Fresnel focusing begins at the plate 2. If the light is in now way impeded or changed after it leaves the plate 2, it will be directed in a series of concentric cones from the rings of the Fresnel pattern to the point of focus $p$. The plate 20 must be placed with regard to this change in transmisison path caused by the activated plate 2. The plate 20 should intercept the focused light and change its status of polarization so that substantially all of the light emerging from the plate 20 is of the same polarization. When this is accomplished, light emerging from plate 20 is defocused and Fresnel interaction no longer occurs.

This analysis not only explains the operation of the Exclusive Or circuit, but it also explains why the plate 20 can usefully be placed quite close to the plate 2 relative to the point of focus $p$. This is true because the change in the transmission path due to the small amount of Fresnel focusing can be ignored. The concentric cones which lead to the point $p$ have not changed substantially in size from their locations at the plate 2. Thus, the plate 20 can be made entirely complimentary in electrode configuration to the plate 2 and the defocusing will occur properly by the action of plate 20. This approximation is illustrated in FIG. 3, where the plate 20 is quite close to the plate 2. In general, however, it must be recognized that the effective transmission path of radiation focused by the plate 2 slopes linearly from the effective diffraction openings to the point of focus $p$.

In summary, it will be noted that with the system shown in FIG. 3 the light focused appears at the point $p$ only when either, but not both, of the inputs is on. The device therefore produces Exclusive Or logic. It operates at high speed and with good definition between the amount of radiation appearing at the point $p$ when the Exclusive Or result should represent a yes and when the Exclusive Or result should indicate a no.

While the invention has been particularly shown and described with reference to the preferred embodiments thereof, it will be understood by those skilled in the art that the foregoing and other changes in form and details may be made therein without departing from the spirit and scope of the invention.

I claim:

1. An electromagnetic radiation gate comprising:

a plurality of transparent first electrodes and a plurality of transparent second electrodes disposed opposite said first electrodes, at least one of said plurality of second electrodes being close to each one of said first electrodes relative to its distance from the other of said first electrodes, an electro-optic substance which exhibits an electro-optic effect when in the presence of an electric field, said electro-optic substance being located between said first electrodes and said second electrodes where said first electrodes and said second electrodes are close together, means to impress an electric field between said first and said second electrodes sufficient to cause said electro-optic substance to exhibit an electro-optic effect near those locations where said first and said second electrodes are close together, said first electrodes, said second electrodes, and said substance being spaced to form lateral gaps between locations where an electro-optic effect is induced to define a Fresnel zone plate and also spaced to form locations at which an electro-optic effect is induced which define a second Fresnel zone plate, and a source of collimated, high frequency, linearly polarized electromagnetic radiation directed substantially perpendicular to said Fresnel zone plate structures defined by said lateral gaps and said locations exhibiting an electro-optic effect.

2. The device according to claim 1 wherein said substance is a relatively thin plate and said first electrodes and said second electrodes are in contact with said plate.

3. A device according to claim 2 wherein said source of radiation produces radiation in the frequency range having wave length of four thousand angstroms to six thousand angstroms.

4. An electromagnetic radiation gate comprising:

a plurality of transparent first electrodes and a plurality of transparent second electrodes disposed opposite said first electrodes, at least one of said plurality of second electrodes being close to each one of said first electrodes relative to its distance from the other of said first electrodes, an electro-optic substance which exhibits an electro-optic effect when in the presence of an electric field, said electro-optic substance being located between said first electrodes and said second electrodes where said first electrodes and said second electrodes are close together, means to impress an electric potential between said first and said second electrodes sufficient to cause said electro-optic substance to exhibit the electro-optic effect near these locations where said first and said second electrodes are close together, said first electrodes, said second electrodes, and said substance being spaced to form lateral gaps between locations where an electro-optic effect is induced to define a Fresnel zone plate having a point of focus, and a source of collimated, high frequency electromagnetic radiation directed substantially perpendicular to said Fresnel zone plate defined by said lateral gaps.

5. The device according to claim 4 also comprising an analyzer between said substance and the point of focus operative to exclude radiation of the polarization induced by said substance when said substance exhibits the electro-optic effect.

6. The device according to claim 5 wherein said substance is a relatively thin plate and said first electrodes and said second electrodes are in contact with said plate.

7. The device according to claim 5 wherein said source of radiation produces radiation in the frequency range having wave length of four thousand angstroms to six thousand angstroms.

8. The device according to claim 6 wherein said source of radiation produces linearly polarized radiation within the frequency range having wave length of four thousand angstroms to six thousand angstroms.

9. An electromagnetic radiation gate comprising: a substance which changes the state of polarization of electromagnetic radiation passing through it only when said substance is activated in the presence of an electric field, a source of parallel, high frequency electromagnetic radiation, and means to selectively impress an electric field across said substance sufficient to activate said substance at locations which define a Fresnel pattern which will diffract said radiation substantially to a point, said means to impress an electric field being transparent to said radiation, said radiation source being directed substantially perpendicular to said pattern, whereby said radiation is focused substantially to said point.

10. The device according to claim 9 in addition comprising a means to block radiation of a polarization orthogonal to a desired polarization located between said substance and said point of focus.

11. The device of claim 10 wherein said substance is large in area and thin across the locations at which said electric field is impressed.

12. A logic device comprising a source of collimated, high frequency electromagnetic radiation, two latent Fresnel zone plates in the transmission path of said radiation each made operable selectively in response to an individual signal to focus radiation substantially to the same point, and means for applying a signal to each of said zone plates, said zone plates having zones which are complementary across the effective transmission path so that creation of both zone plates causes substantially the entire transmission path to be modified in the same way.

13. The device according to claim 12 wherein said lenses are close together relative to said point of focus.

14. The device according to claim 12 wherein each of said latent zone plates is comprised of a plurality of transparent, first electrodes and a plurality of transparent second electrodes disposed opposite said first electrodes, at least one of said plurality of second electrodes being close to each one of said first electrodes relative to its distance from the other of said first electrodes and said latent zone plates also comprised of an electro-optic substance which exhibits an electro-optic effect when in the presence of an electric field, said electro-optic substance being located between said first electrodes and said second electrodes where said first electrodes and said second electrodes are close together and wherein said latent zone plates are selectively made operative by means to impress an electric potential across said first and said second electrodes.

15. The device according to claim 14 wherein said latent zone plates are close together relative to said point of focus and an analyzer is located between the point of focus and the latent zone plate closest to the point of focus, said analyzer being operative to exclude radiation of the polarization induced by activation of said latent zone plates.

16. A logic device comprising, a source of collimated, high frequency electromagnetic radiation, two latent patterns for causing diffraction in the transmission path of said radiation, each individually operable in response to a signal, each of said diffraction patterns being such as to diffract said radiation to substantially the same point, said diffraction patterns having alternate zones which are complementary across the effective transmission path so that creation of both patterns causes substantially the entire transmission path to be modified in the same way, said patterns being comprised of a substance which changes the status of polarization of electromagnetic radiation passing through it only when said substance is activated in the presence of an electric field, first means to selectively impress an electric field across the substance defining one latent diffraction pattern sufficient to activate said substance at locations which define the pattern, and second means to selectively impress an electric field across the substance defining the other latent diffraction pattern sufficient to activate said substance at locations which define the pattern, said first and second means to impress an electric field being transparent to said radiation.

17. The device according to claim 16 wherein said patterns for causing diffraction are close together relative to said point of focus and also comprising a means to block radiation of a polarity induced by said substance, said means to block radiation being located between the point of focus and the pattern closest to the point of focus.

18. An electromagnetic radiation gate comprising:

a plurality of transparent first electrodes and a plurality of transparent second electrodes disposed opposite said first electrodes, at least one of said plurality of second electrodes being close to each one of said first electrodes relative to its distance from the other of said first electrodes, an electro-optic substance which exhibits an electro-optic effect when in the presence of an electric field, said electro-optic substance being located between said first electrodes and said second electrodes where said first electrodes and said second electrodes are close together, means to impress an electric potential across said first and said second electrodes sufficient to cause said electro-optic substance to exhibit the electro-optic effect near those locations where said first and said second electrodes are close together, said locations defining a Fresnel zone plate, and a source of collimated, high frequency electromagnetic radiation directed substantially perpendicular to said Fresnel zone plate defined by said lateral gaps.

References Cited

Use of Optical Masers In Displays and Printers, D.D.C. Second Quarterly Report, AD 417, 500, pp. 14–17, Sept. 25, 1963.

JEWELL H. PEDERSEN, *Primary Examiner.*

RONALD L. WIBERT, *Assistant Examiner.*